United States Patent
Iwamoto (10) Patent No.: US 9,217,851 B2
(45) Date of Patent: Dec. 22, 2015

(54) ZOOM LENS AND IMAGE PICKUP DEVICE INCLUDING THE SAME

(71) Applicant: CANON KABUSHIKI KAISHA, Tokyo (JP)

(72) Inventor: Shunji Iwamoto, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 68 days.

(21) Appl. No.: 14/231,836

(22) Filed: Apr. 1, 2014

(65) Prior Publication Data

US 2014/0307152 A1    Oct. 16, 2014

(30) Foreign Application Priority Data

Apr. 15, 2013  (JP) ................. 2013-084687

(51) Int. Cl.
  *G02B 15/177*   (2006.01)
  *H04N 5/225*    (2006.01)
  *G02B 15/16*    (2006.01)

(52) U.S. Cl.
  CPC .............. *G02B 15/177* (2013.01); *G02B 15/16* (2013.01); *G02B 15/161* (2013.01); *H04N 5/2254* (2013.01)

(58) Field of Classification Search
  CPC ...... G02B 15/14; G02B 15/16; G02B 15/161; G02B 15/177; H04N 5/2254
  See application file for complete search history.

(56) References Cited

U.S. PATENT DOCUMENTS

| 8,199,411 B2 | 6/2012 | Fujimoto | |
| 2014/0055659 A1* | 2/2014 | Iwamoto | 348/335 |
| 2014/0192419 A1* | 7/2014 | Inoko | 359/649 |
| 2015/0146085 A1* | 5/2015 | Hatada | 348/360 |

FOREIGN PATENT DOCUMENTS

JP    2004-240038 A    8/2004

* cited by examiner

*Primary Examiner* — David N Spector (74) *Attorney, Agent, or Firm* — Carter, DeLuca, Farrell & Schmidt, LLP (57) ABSTRACT

A zoom lens includes a front unit including one lens unit having a negative refractive power, and a rear unit including an aperture stop and one or more lens units and having a positive refractive power as a whole, and an interval between adjacent lens units changes during zooming such that an interval between the front unit and rear unit decreases at a telephoto end when compared to a wide angle end. The front unit includes a negative lens G11 in a position closest to the object side, and a lens surface of the negative lens G11 on the image side has an aspherical shape by which the positive refractive power increases from a center to an edge. Various parameters for the zoom lens according to the present invention are properly set.

14 Claims, 7 Drawing Sheets

ZOOM LENS AND IMAGE PICKUP DEVICE INCLUDING THE SAME

BACKGROUND OF THE INVENTION

1. Field of the Invention

The present invention relates to a zoom lens and, more particularly, to a zoom lens suitable as an image pickup optical system of an image pickup device such as a digital still camera, video camera, TV camera, or monitoring camera.

2. Description of the Related Art

An image pickup optical system for use in an image pickup device is required to be a compact zoom lens having a wide angle of field and a high optical performance to the edge of a field. It is known that a negative lead type zoom lens in which a negative-refractive-power lens unit arranged closest to an object side is suited to widen the angle of field because a retrofocus type refractive power arrangement is adopted at a wide angle end.

In a zoom lens having a wide angle of field, an angle to the optical axis of an offaxial light ray is large, so the entrance height of the offaxial light ray is very large in a negative-refractive-power lens unit arranged closest to the object side. Therefore, if the lens configuration of the lens unit arranged closest to the object side or the shape of a negative lens in the lens unit is inadequate, offaxial aberrations such as distortion, field curvature, and astigmatism increase at the wide angle end, and it is difficult to sufficiently correct them.

Also, to decrease the front lens effective aperture (the effective aperture of the lens unit arranged closest to the object side), it is necessary to improve the configuration of the lens unit arranged closest to the object side, i.e., increase the refractive power of a lens arranged closest to the object side. Offaxial aberrations increase when the refractive power of a first lens unit is increased and the front lens effective aperture is decreased.

In the zoom lenses of Japanese Patent Application Laid-Open No. 2004-240038 and U.S. Pat. No. 8199411, an aspherical lens is used as a lens on the object side in the first lens unit in which the entrance height of the offaxial light ray is largest to correct the offaxial aberrations.

SUMMARY OF THE INVENTION

There is provided a zoom lens comprising a front unit including one lens unit having a negative refractive power, and a rear unit including an aperture stop and one or more lens units and having a positive refractive power as a whole, in an order named from an object side to an image side, an interval between adjacent lens units changing during zooming such that an interval between the front unit and the rear unit decreases at a telephoto end when compared to a wide angle end, wherein the front unit includes a negative lens G11 in a position closest to the object side, and a lens surface of the negative lens G11 on the image side has an aspherical shape by which the positive refractive power increases from a center to an edge, and letting t11 be a length in an optical axis direction from a surface vertex of a lens surface of the negative lens G11 on the object side to an edge of an effective aperture of the lens surface on the image side, y111 be a radius of the effective aperture of the lens surface of the negative lens G11 on the object side, f11 be a focal length of the negative lens G11, f1 be a focal length of the front unit, f2w be a synthetic focal length of the rear unit at the wide angle end, and fw be a focal length of a whole system at the wide angle end, conditional expressions below are met:

$$0.36 < t11/y111 < 0.47$$

$$-2.0 < f11/fw < -1.3$$

$$-0.58 < f1/f2w < -0.20$$

Further features of the present invention will become apparent from the following description of exemplary embodiments with reference to the attached drawings.

DESCRIPTION OF THE EMBODIMENTS

Preferred embodiments of the present invention will be explained in detail below in accordance with the accompanying drawings. A zoom lens of the present invention includes a front unit including one lens unit having a negative refractive power, and a rear unit including an aperture stop and one or more lens units and having a positive refractive power as a whole, in this order from an object side to an image side. In this zoom lens, an interval between adjacent lens units changes during zooming such that an interval between the front unit and rear unit decreases at a telephoto end when compared to a wide angle end.

Figure 1:
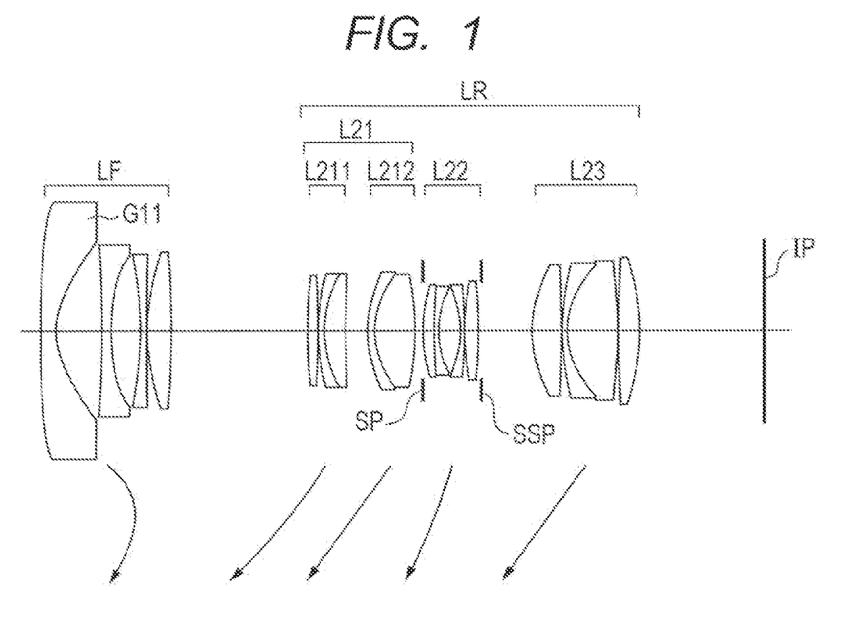
FIG. 1 is a view showing lens sections at a wide angle end of a zoom lens of the first embodiment.
Figure 2A:
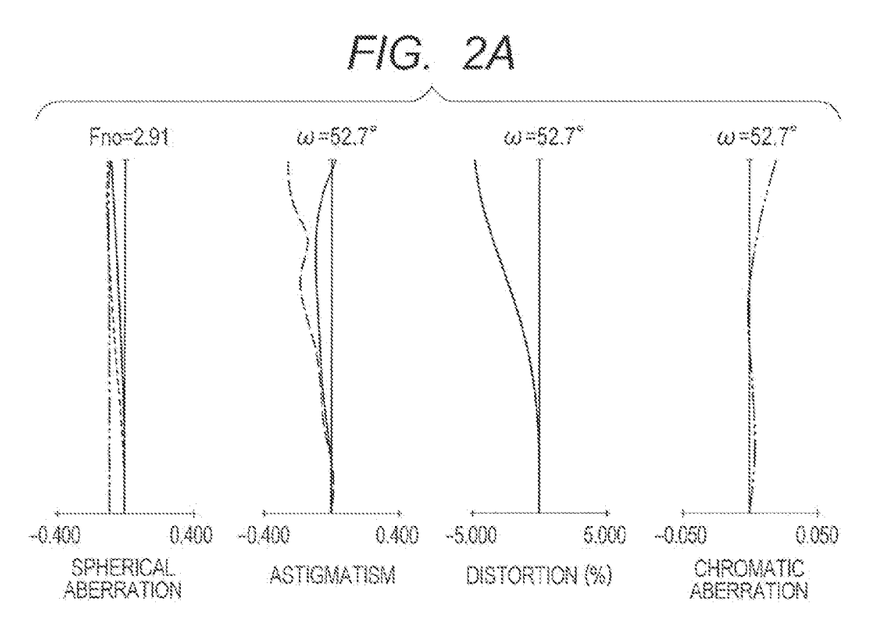
FIG. 2A is a view showing aberrations at the wide angle end of the zoom lens of the first embodiment.
Figure 2B:
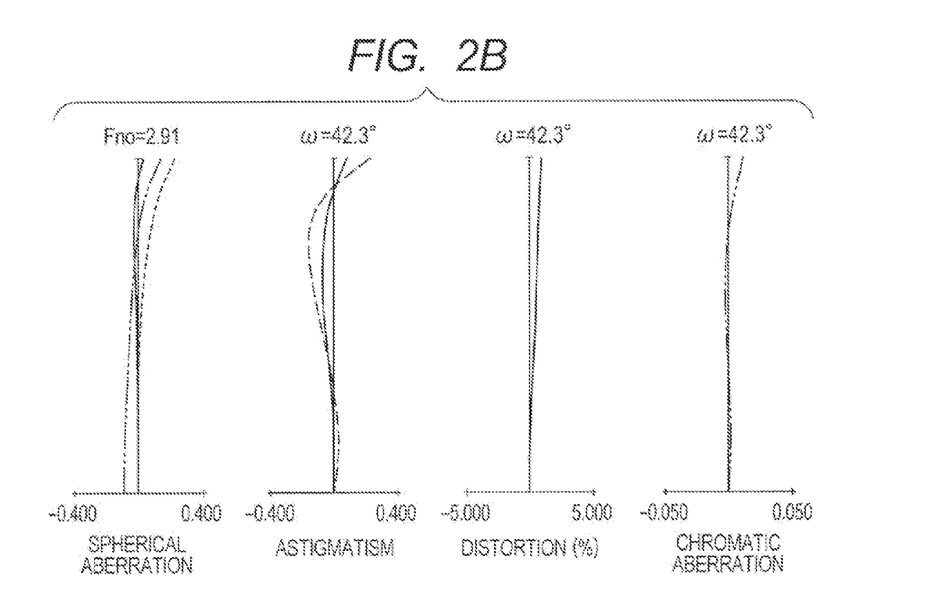
FIG. 2B is a view showing aberrations at an intermediate zoom position of the zoom lens of the first embodiment.
Figure 2C:
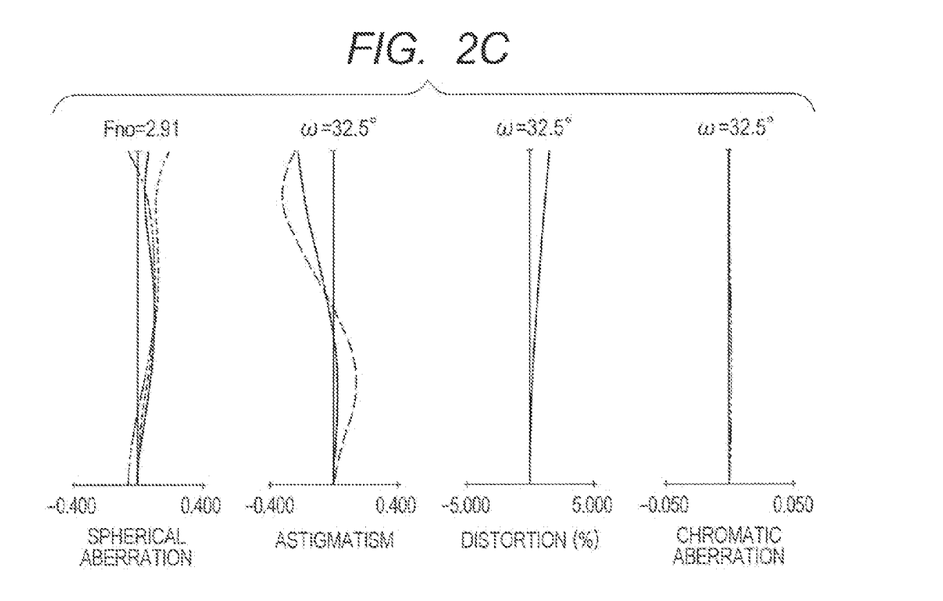
FIG. 2C is a view showing aberrations at a telephoto end of the zoom lens of the first embodiment.

FIG. 1 is a view showing lens sections at a wide angle end (short focal length end) of a zoom lens of the first embodiment of the present invention. FIGS. 2A, 2B, and 2C are views showing aberrations at the wide angle end, an intermediate zoom position, and a telephoto end (long focal length end), respectively, of the zoom lens of the first embodiment. The first embodiment is a zoom lens having a zoom ratio of 2.06 and an aperture ratio of 2.91.

Figure 3:
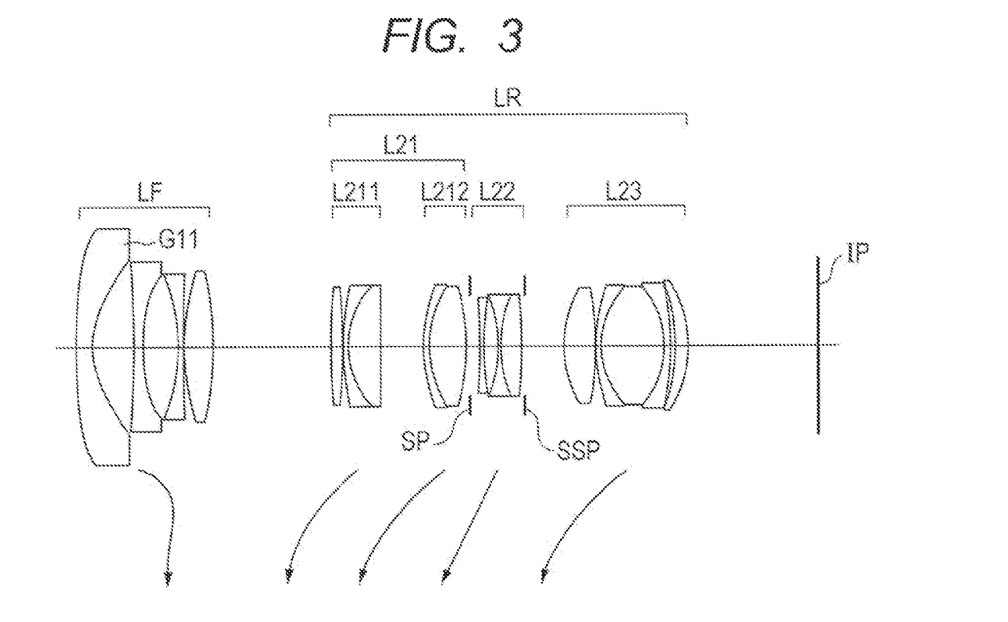
FIG. 3 is a view showing lens sections at a wide angle end of a zoom lens of the second embodiment.
Figure 4A:
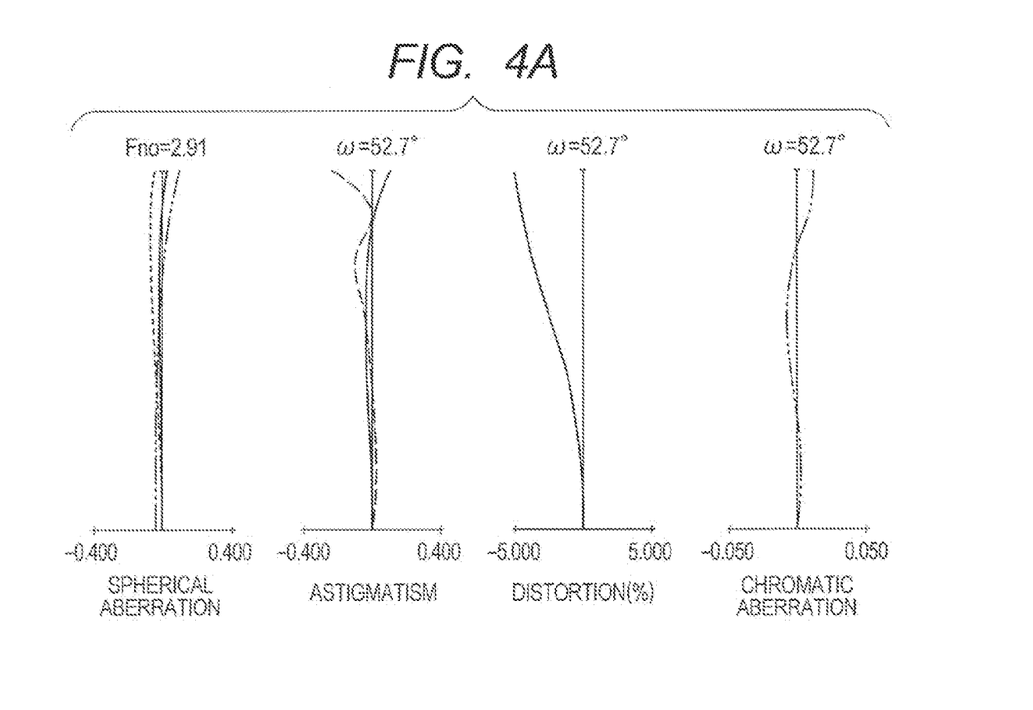
FIG. 4A is a view showing aberrations at the wide angle end of the zoom lens of the second embodiment.
Figure 4B:
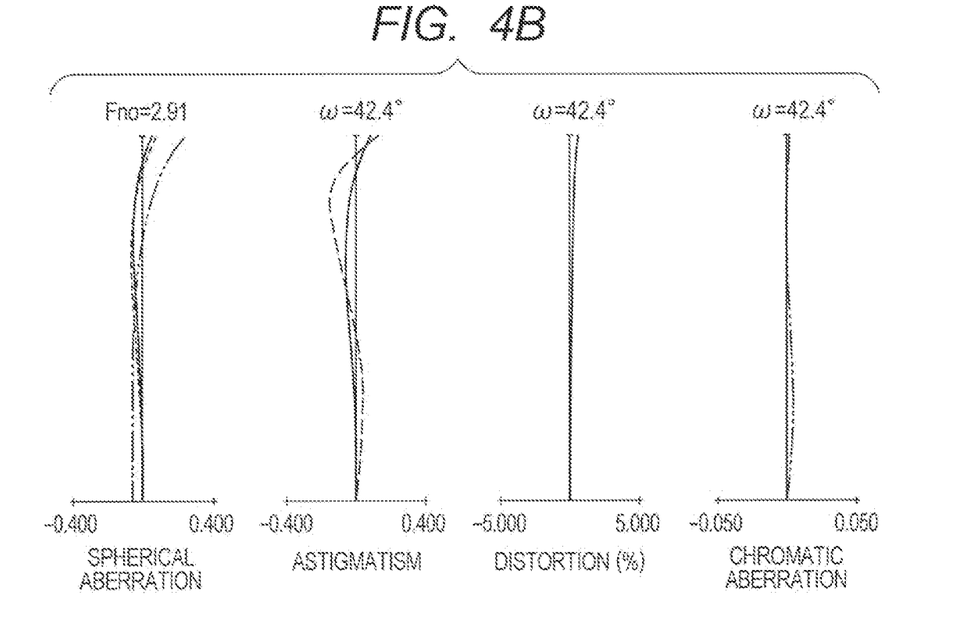
FIG. 4B is a view showing aberrations at an intermediate zoom position of the zoom lens of the second embodiment.
Figure 4C:
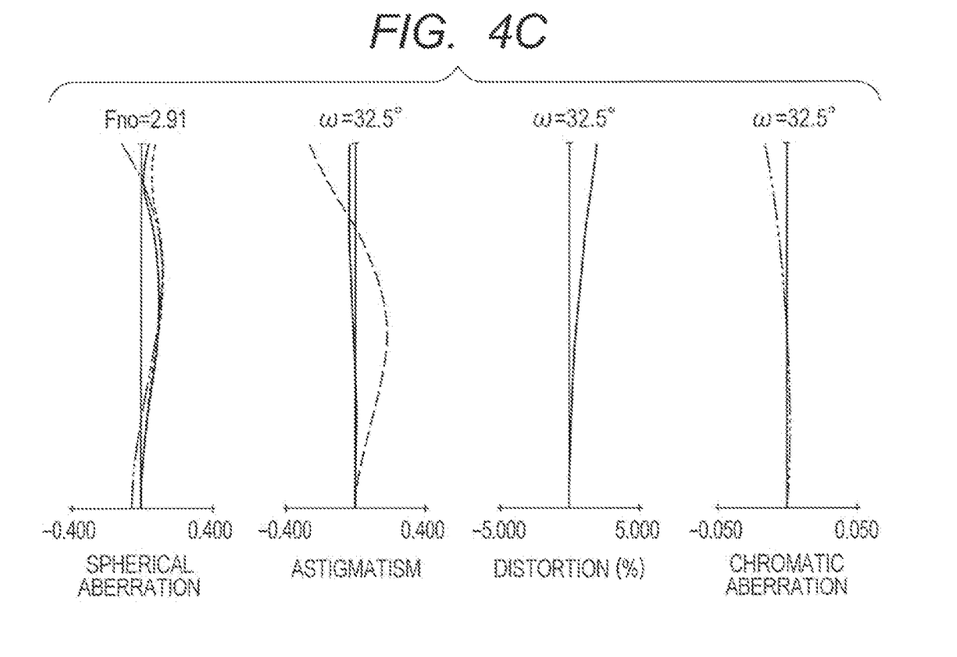
FIG. 4C is a view showing aberrations at a telephoto end of the zoom lens of the second embodiment.

FIG. 3 is a view showing lens sections at a wide angle end of a zoom lens of the second embodiment of the present invention. FIGS. 4A, 4B, and 4C are views showing aberrations at the wide angle end, an intermediate zoom position, and a telephoto end, respectively, of the zoom lens of the second embodiment. The second embodiment is a zoom lens having a zoom ratio of 2.06 and an aperture ratio of 2.91.

Figure 5:
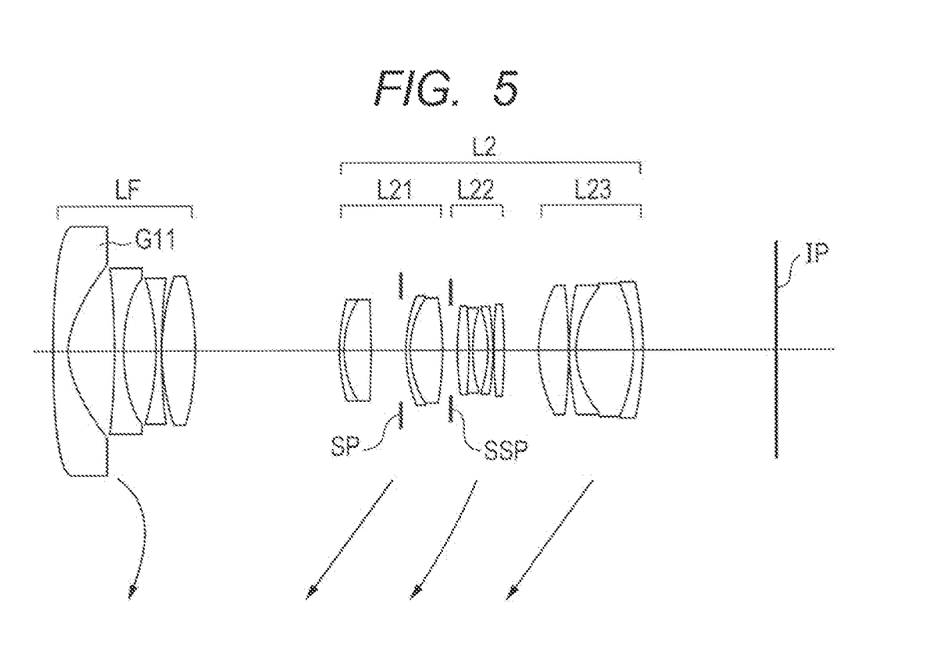
FIG. 5 is a view showing lens sections at a wide angle end of a zoom lens of the third embodiment.
Figure 6A:
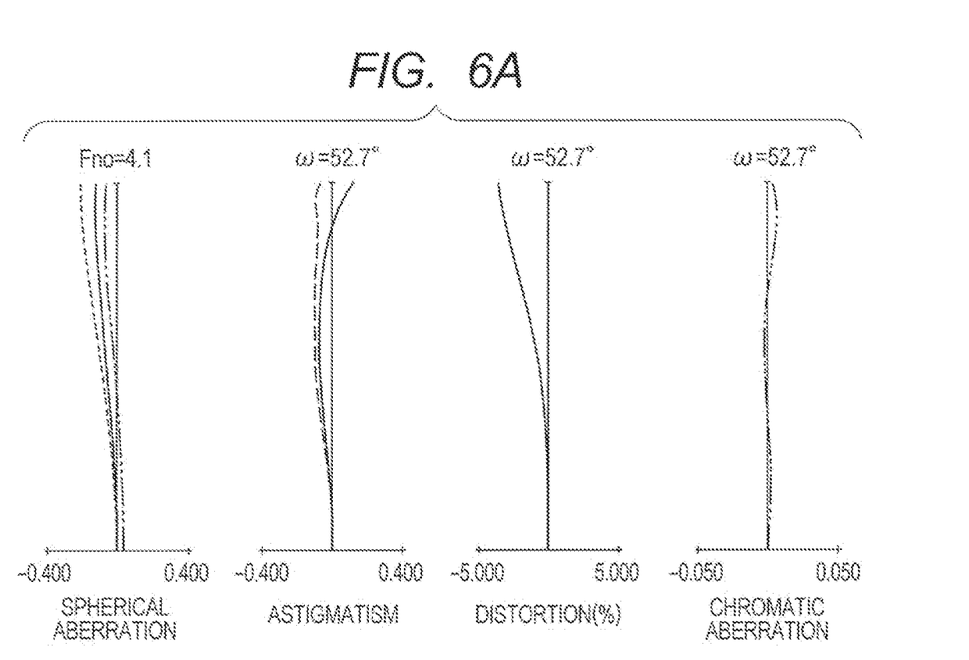
FIG. 6A is a view showing aberrations at the wide angle end of the zoom lens of the third embodiment.
Figure 6B:
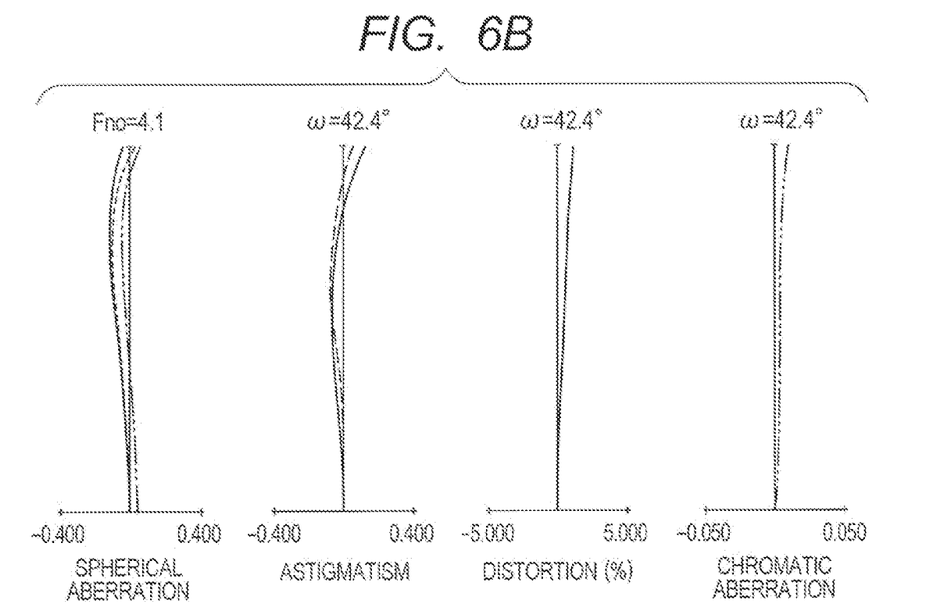
FIG. 6B is a view showing aberrations at an intermediate zoom position of the zoom lens of the third embodiment.
Figure 6C:
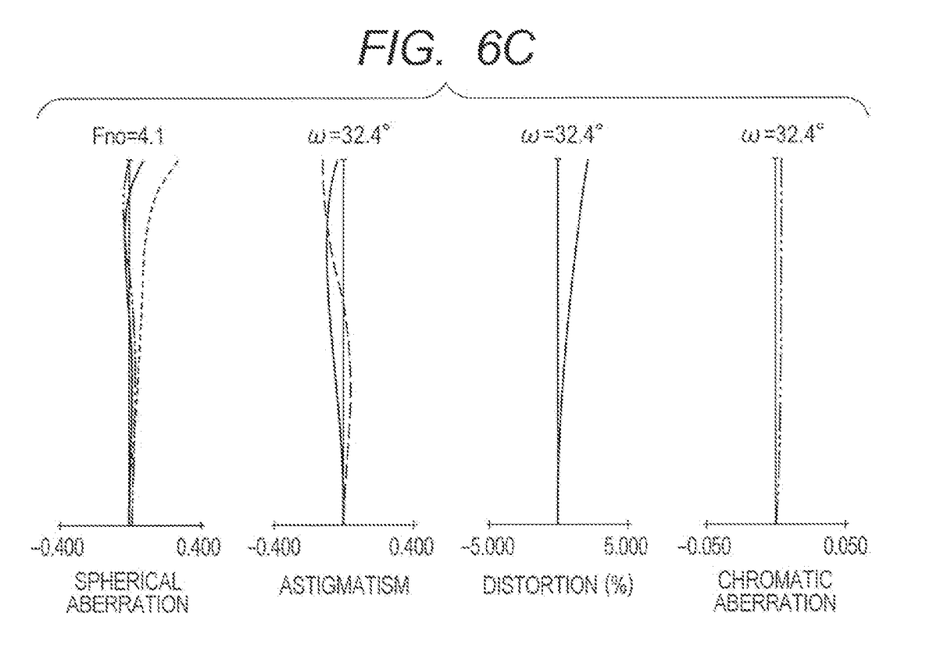
FIG. 6C is a view showing aberrations at a telephoto end of the zoom lens of the third embodiment.

FIG. 5 is a view showing lens sections at a wide angle end of a zoom lens of the third embodiment of the present invention. FIGS. 6A, 6B, and 6C are views showing aberrations at the wide angle end, an intermediate zoom position, and a telephoto end, respectively, of the zoom lens of the third embodiment. The third embodiment is a zoom lens having a zoom ratio of 2.07 and an aperture ratio of 4.10.

Figure 7:
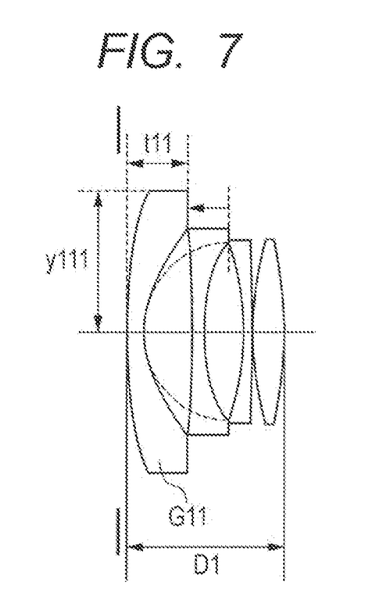
FIG. 7 is a view for explaining an aspherical shape according to the present invention.
Figure 8:
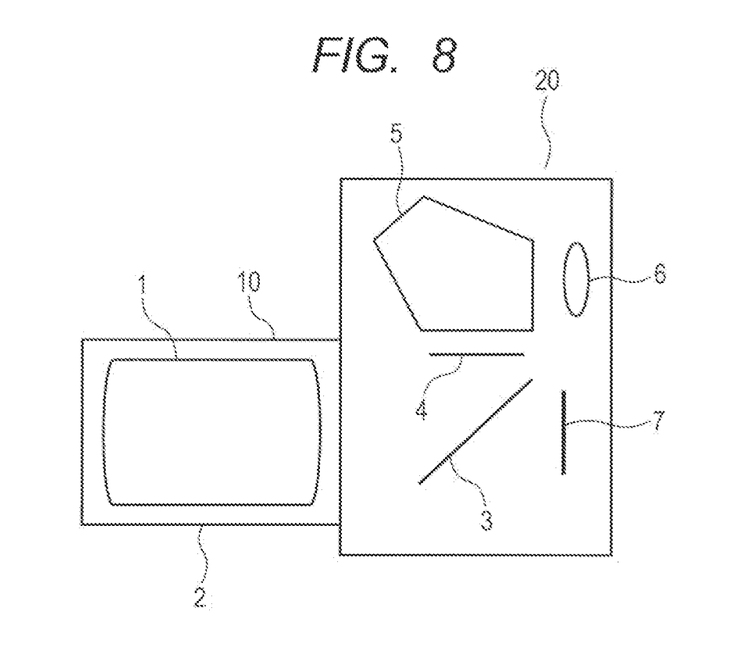
FIG. 8 is a schematic view showing main parts of an image pickup device of the present invention.

FIG. 7 is a view for explaining an aspherical shape. FIG. 8 is a schematic view showing main components of a digital still camera (image pickup device) including the zoom lens of the present invention. In each lens sectional view, the left side is the object side (front side), and the right side is the image side (back side).

In each lens sectional view, a front unit LF includes one lens unit having a negative refractive power. A rear unit LR includes an aperture stop and one or more lens units and having a positive refractive power as a whole. An f-number determining member SP (to be referred to as an "aperture stop" hereinafter) functions as an aperture stop for determining (restricting) a maximum f-number (Fno) luminous flux. A variable stop SSP reduces a variation in f-number during zooming. When using the zoom lens as an image pickup optical system of a video camera or digital still camera, an image pickup plane of a solid-state image sensor (photoelectric conversion element) such as a CCD sensor or CMOS sensor is placed on an image plane IP.

When using the zoom lens as an image pickup optical system of a silver halide film camera, a photosensitive surface equivalent to a film surface is placed on the image plane IP. In a spherical aberration view, a solid line represents a d-line (wavelength=587.6 nm), an alternate long and two short dashed line represents a g-line (wavelength=435.8 nm), and a dotted line represents an F-line (wavelength=486.1 nm). In an astigmatism view, a dotted line represents a meridional image plane of the d-line, and a solid line represents a sagittal image plane of the d-line. Also, lateral chromatic aberration represents the difference of the g-line from the d-line.

Fno is the f-number. ω is a half angle of field. Note that in each of the following embodiments, the wide angle end and telephoto end are zoom positions when a variable magnification lens unit is mechanically positioned at the two ends of a movable range on the optical axis. In each lens sectional view, each arrow indicates the moving locus of each lens unit during zooming from the wide angle end to the telephoto end.

The features of the zoom lenses of the present invention will be explained below. Generally, the aberration amount of an image pickup lens having a wide angle of field is larger than that of an image pickup lens having a standard angle of field. This is so because in an image pickup lens having a wide angle of field, a so-called retrofocus type refractive power arrangement is adopted in order to obtain a back focus having a sufficient length. That is, a negative-refractive-power front unit, aperture stop, and positive-refractive-power rear unit are arranged in this order from the object side to the image side, thereby obtaining an asymmetrical refractive power arrangement with respect to the aperture stop.

As the angle of field increases, the asymmetry of this refractive power arrangement increases. Consequently, various aberrations such as distortion, lateral chromatic aberration, field curvature, astigmatism, and sagittal coma flare increase, and it becomes difficult to correct these various aberrations. In addition, when the image pickup angle of field increases, the marginal lumination reduces in accordance with a so-called cosine w fourth law, and it becomes difficult to secure the marginal lumination. To ensure the marginal lumination, a necessary aperture efficiency increases as the angle of field increases. As a consequence, coma increases and becomes difficult to correct.

The optical characteristics as described above similarly apply to a zoom lens, i.e., various aberrations increase when increasing the angle of field by enlarging a wide angle region. Especially in a zoom lens including a very wide angle region in which the image pickup angle of field exceeds 100°, various aberrations such as distortion, field curvature, and astigmatism increase at the wide angle end. On the other hand, the front lens effective aperture must be reduced in order to downsize the whole zoom lens. To reduce the front lens effective aperture, the entrance pupil position must be put close to the first lens surface of a lens system by increasing the negative refractive power of a lens unit on the object side. If this is performed, however, the asymmetrical refractive power arrangement of the whole zoom lens becomes stronger, and makes it more difficult to correct the various aberrations.

Accordingly, to sufficiently correct the various aberrations that occur when increasing the angle of field and downsizing the whole system, it is important to properly set the refractive power arrangement of each lens unit forming the zoom lens. Also, in a general zoom lens having a wide angle of field, the entrance height of an offaxial light ray to the lens is largest in a lens unit closest to the object side, so the first lens unit has a large influence on offaxial aberration. To obtain a wide angle of field, therefore, it is important to properly set the lens configuration of the first lens unit.

The zoom lens of the present invention has a maximum image pickup angle of field exceeding 100° and a zooming performance of about 2 by properly setting the lens configuration of the first lens unit and the refractive power arrangement of each lens unit. Also, the zoom lens has a high image formation performance from the center to the edge of a field in the entire zoom region, and achieves a small front lens effective aperture.

The zoom lens of the present invention includes the front unit LF including one lens unit having a negative refractive power, and the rear unit LR including an aperture stop and one or more lens units and having a positive refractive power as a whole, in this order from the object side to the image side. When performing zooming, intervals between adjacent lens units change so that the interval between the front unit LF and rear unit LR decreases at the telephoto end when compared to the wide angle end. By using a retrofocus refractive power arrangement at the wide angle end, a back focus having a predetermined length is obtained at the wide angle end.

The front unit LF includes a negative lens (a lens having a negative refractive power) G11 in a position closest to the object side, and the lens surface of the negative lens G11 on the image side has an aspherical shape by which a positive refractive power increases toward the edge. Since the lens surface of the negative lens G11 on the image side has the aspherical shape by which the positive refractive power increases (the negative refractive power decreases) toward the edge, aberrations occurring from the front unit LF having the negative refractive power, particularly, distortion and coma are sufficiently corrected at the wide angle end. Also, when using the aspherical shape by which the positive refractive power increases toward the edge, the edge of the lens surface bends toward the object side when compared to a spherical shape, as shown in FIG. 7. This makes it possible to decrease a thickness til of the negative lens G11 in the optical axis direction.

That is, by increasing the aspherical surface amount by giving the lens surface of the negative lens G11 on the image side the aspherical shape by which the positive refractive power increases (the negative refractive power decreases) toward the edge, the curvature radius of the lens surface of the negative lens G11 on the image side is set at a small value.

This facilitates decreasing the thickness of the negative lens G11 in the optical axis direction, and facilitates decreasing the front lens effective aperture.

The rear lens LR includes a 1st lens unit L21 having the positive refractive power, a 2nd lens unit L22 having the negative refractive power, and a 3rd lens unit L23 having the positive refractive power, in this order from the object side to the image side. When performing zooming, these lens units move such that the interval between the 1st lens unit L21 and 2nd lens unit L22 increases and the interval between the 2nd lens unit L22 and 3rd lens unit L23 decreases at the telephoto end when compared to the wide angle end. A predetermined zoom ratio is secured by thus giving the rear unit LR a variable magnification effect. In addition, the relative moving amounts of the front unit LF and rear unit LR caused by magnification change are decreased by giving the variable magnification effect to the rear unit LR.

Furthermore, this shortens the entrance pupil position at the wide angle end, and facilitates decreasing the front lens effective aperture. In each embodiment, it is also possible to divide the 1st lens unit L21 into a 1st sub lens unit L211 having the positive refractive power, and a 2nd sub lens unit L212 having the positive refractive power, and change the interval between the two lens units during zooming. This facilitates suppressing variations in spherical aberration and coma caused by zooming.

In each embodiment, the front unit LF includes the negative lens G11 in the position closest to the object side, and the lens surface of the negative lens G11 on the image side has the aspherical shape by which the positive refractive power increases from the center to the edge. Let t11 be the length in the optical axis direction from the surface vertex of the lens surface of the negative lens G11 on the object side to the end portion of the effective aperture of the lens surface on the image side. Let y111 be the radius of the effective aperture of the lens surface of the negative lens G11 on the object side. Let f11 be the focal length of the negative lens G11. Let f1 be the focal length of the front unit LF.

Let f2w be the synthetic focal length of the rear unit LR at the wide angle end. Let fw be the focal length of the whole system at the wide angle end. In this state, the following conditional expressions are met:

$$0.36 < t11/y111 < 0.47 \quad (1)$$

$$-2.0 < f11/fw < -1.3 \quad (2)$$

$$-0.58 < f1/f2w < -0.20 \quad (3)$$

The technical meanings of the above-described conditional expressions will be explained below. Conditional expression (1) defines the thickness in the optical axis direction from the surface vertex of the lens surface of the negative lens G11 on the object side to the end portion of the effective aperture of the lens surface on the image side. If the thickness of the negative lens G11 in the optical axis direction exceeds the upper limit of conditional expression (1), the thickness is too large, and the front lens effective aperture increases. If the thickness decreases below the lower limit, the thickness is advantageous in decreasing the front lens effective aperture, but the aspherical surface amount of the lens surface of the negative lens G11 on the image side increases too much, and this makes it difficult to manufacture the lens.

Conditional expression (2) defines the ratio of the focal length of the negative lens G11 to the focal length of the whole system at the wide angle end. If this ratio exceeds the upper limit of conditional expression (2), the refractive power of the negative lens G11 increases too much, and this makes it difficult to correct offaxial aberration especially at the wide angle end. If the ratio decreases below the lower limit, the negative refractive power of the negative lens G11 decreases too much, and the front lens effective aperture increases.

Conditional expression (3) defines the ratio of the focal length of the front unit LF to the synthetic focal length of the rear unit LR at the wide angle end. If this ratio exceeds the upper limit of conditional expression (3), the negative refractive power of the front unit LF increases too much, and many offaxial aberrations occur especially at the wide angle end, and they are difficult to correct. If the ratio decreases below the lower limit, it becomes difficult to obtain a back focus having a sufficient length at the wide angle end. The numerical ranges of conditional expressions (1) to (3) are more preferably set at the following values:

$$0.42 < t11/y111 < 0.45 \quad (1a)$$

$$-1.80 < f11/fw < -1.55 \quad (2a)$$

$$-0.52 < f1/f2w < -0.35 \quad (3a)$$

Since each embodiment has the arrangement as described above, it is possible to obtain a zoo lens having a wide angle of field, a high zoom ratio, a high image formation performance to the edge of a field in the entire zoom region, and a small front lens effective aperture.

In each embodiment, it is more favorable to satisfy one or more of the following conditional expressions. The zoom lens includes a negative lens G12 on the image side of the negative lens G11. Let N12 be the refractive index of the material of the negative lens G12. Let vii be the Abbe's number of the material of the negative lens G11. Let N11 be the refractive index of the material of the negative lens G11. The lens surface of the negative lens G11 on the object side has an aspherical shape. Let Asph112 be the aspherical surface amount at a height equal to 70% of the radius of the light ray effective aperture of the lens surface of the negative lens G11 on the object side. Let D1 be the interval on the optical axis between the lens surface, which is closest to the object side, of the front unit LF and the lens surface, which is closest to the image side, of the front unit LF.

The lens surface of the negative lens G12 on the object side has an aspherical shape. Let Asph122 be the aspherical surface amount at a height equal to 70% of the radius of the light ray effective aperture of the lens surface of the negative lens G12 on the object side. Let ft be the focal length of the whole system at the telephoto end. Let f22 be the focal length of the 2nd lens unit L22. Let f23 be the focal length of the 3rd lens unit L23. Under the conditions, one or more of the following conditional expressions are preferably satisfied:

$$1.80 < N12 < 2.10 \quad (4)$$

$$40 < v11 < 70 \quad (5)$$

$$0.010 < Asph112 \times (N11-1)/D1 < 0.040 \quad (6)$$

$$0.30 < (Asph122 \times (N12-1)/D1)/(Asph112 \times (N11-1)/D1) < 1.00 \quad (7)$$

$$-1.20 < f1/\sqrt{(fw \times ft)} < -0.80 \quad (8)$$

$$-2.50 < f22/\sqrt{(fw \times ft)} < -1.00 \quad (9)$$

$$1.00 < f23/\sqrt{(fw \times ft)} < 2.00 \quad (10)$$

The above-described aspherical surface amount will be defined as follows.

When the X-axis is the optical axis direction, the H-axis is a direction perpendicular to the optical axis, the light propagation direction is positive, R is the paraxial curvature radius, and K, A2, A4, A6, A8, A10, and A12 are aspherical constants, an aspherical shape $X_{ASPH}$ is represented by:

$$X_{ASPH} = \frac{(1/R)}{1+\sqrt{1-(1+K)(H/R)^2}} + A_2H^2 + A_4H^4 + A_6H^6 + A_8H^8 + A_{10}H^{10} + A_{12}H^{12}$$

Also, letting $R_{REF}$ be the curvature radius of a sphere connecting a surface vertex and a point in the position of the light ray effective aperture of an aspherical surface, a shape $X_{REF}$ of a reference sphere is represented by:

$$X_{REF} = \frac{(1/R_{REF})}{1+\sqrt{1-(1+K)(H/R_{REF})^2}}$$

An aspherical surface amount ASPH(H) at a height H in the direction perpendicular to the optical axis is defined by:

ASPH(H)=|$X_{ASPH}$(H)−$X_{REF}$(H)|

The technical meanings of the above-described conditional expressions will be explained below. Conditional expression (4) defines the refractive index of the material of the negative lens G12. If the value decreases below the lower limit of conditional expression (4), the Petzval sum increases, and field curvature becomes over in the entire zoom region. If the value exceeds the upper limit, processable optical materials are significantly limited.

Conditional expression (5) defines the Abbe's number of the material of the negative lens G11. If the value decreases below the lower limit of conditional expression (5), the material of the negative lens G11 is highly dispersed, so a change in distortion correcting effect of the negative lens G11 caused by the wavelength increases, and the bend of lateral chromatic aberration increases. The bend of lateral chromatic aberration is the difference between lateral chromatic aberrations produced by an image height. On the other hand, if the value exceeds the upper limit, the bend of lateral chromatic aberration is readily suppressed. Since, however, a low-dispersion material generally has a low refractive index, the refractive power of the negative lens G11 decreases, and the size of the whole system increases.

Conditional expression (6) defines the aspherical surface amount at a height equal to 70% of the radius of the light ray effective aperture of the lens surface of the negative lens G11 on the object side. If the aspherical surface amount increases beyond the upper limit of conditional expression (6), the manufacturing sensitivity becomes too high. If the aspherical surface amount decreases below the lower limit, the aspherical surface amount is too small, and this makes it difficult to sufficiently achieve the effect of an aspherical surface.

Conditional expression (7) defines the ratio of the aspherical surface amount at a height equal to 70% of the radius of the light ray effective aperture of the lens surface of the negative lens G11 on the object side to the aspherical surface amount at a height equal to 70% of the radius of the light ray effective aperture of the lens surface of the negative lens G12 on the object side. If the aspherical surface amount of the negative lens G11 increases and goes below the lower limit of conditional expression (7), distortion is readily corrected at the wide angle end. However, field curvature and coma at the wide angle end and spherical aberration at the telephoto end are excessively corrected.

Also, if the aspherical surface amount of the negative lens G12 increases beyond the upper limit, field curvature and coma at the wide angle end and spherical aberration at the telephoto end are readily corrected, but distortion becomes difficult to correct at the wide angle end.

Conditional expression (8) defines the focal length of the front unit LF. If the value exceeds the upper limit of conditional expression (8), the absolute value of the focal length of the front unit LF becomes too small (the negative refractive power becomes too high), and this makes it difficult to correct field curvature and distortion at the wide angle end. If the value decreases below the lower limit, the absolute value of the focal length of the front unit LF becomes too large (the negative refractive power becomes too low), and the size of the whole system increases.

Conditional expression (9) defines the focal length of the 2nd lens unit L22. If the value exceeds the upper limit of conditional expression (9), the absolute value of the focal length of the 2nd lens unit L22 becomes too small, and spherical aberration is excessively corrected at the telephoto end. If the value decreases below the lower limit, the absolute value of the focal length of the 2nd lens unit L22 becomes too large, so a moving amount for changing the magnification becomes too large, and the size of the whole system increases.

Conditional expression (10) defines the focal length of the 3rd lens unit L23. If the value decreases below the lower limit of conditional expression (10), the absolute value of the focal length of the 3rd lens unit L23 becomes too small, and it becomes difficult to correct distortion at the wide angle end and spherical aberration at the telephoto end. If the value exceeds the upper limit, the absolute value of the focal length of the 3rd lens unit L23 becomes too large, and it becomes difficult to ensure a back focus having a sufficient length. The numerical value ranges of conditional expressions (4) to (10) are more preferably set at the following values:

$1.84<N12<1.89$ (4a)

$46<v11<65$ (5a)

$0.011<Asph112\times(N11-1)/D1<0.033$ (6a)

$0.50<(Asph122\times(N12-1)/D1)/(Asph112\times(N11-1)/D1)<0.80$ (7a)

$-1.05<f1/\sqrt{(fw\times ft)}<-0.85$ (8a)

$-1.80<f22/\sqrt{(fw\times ft)}<-1.30$ (9a)

$1.10<f23/\sqrt{(fw\times ft)}<1.75$ (10a)

Note that the front lens effective aperture mentioned in this specification is defined by the entrance height of a maximum light ray at the position of the surface vertex of the lens surface closest to the object side.

In each embodiment, the two lens surfaces of the negative lens G11 preferably have an aspherical shape, and the lens surface of the negative lens G11 on the object side preferably has an aspherical shape by which the positive refractive power increases from the center to the edge. The entrance height of an offaxial light ray on the lens surface of the negative lens G11 on the object side is largest at the wide angle end. This facilitates correcting various aberrations on the edge, particularly distortion, at the wide angle end.

The zoom lens of the present invention includes the negative lens G12 on the image side of the negative lens G11, and the negative lens G12 preferably has an aspherical lens surface by which the negative refractive power increases from the center to the edge.

In the zoom lens of the present invention, the lens surface of the negative lens G11 on the image side, on which the entrance height of an offaxial light ray is largest, has an aspherical shape by which the positive refractive power increases toward the edge, thereby increasing the aspherical surface amount. This facilitates sufficiently correcting distortion at the wide angle end. On the other hand, field curvature and coma at the wide angle end and spherical aberration at the telephoto end are often excessively corrected.

Therefore, the negative lens G12 on which the entrance height of an offaxial light ray is smaller than that on the negative lens G11 is given an aspherical shape by which the negative refractive power increases toward the edge, thereby sufficiently correcting field curvature and coma at the wide angle end and spherical aberration at the telephoto end. More preferably, the two lens surfaces of the negative lens G12 have an aspherical shape. It is unfavorable to increase the aspherical surface amount of the lens surface of the negative lens G12 on the image side, because the entrance angle of an offaxial light ray to the lens surface of the negative lens G12 on the image side is large, and the manufacturing sensitivity increases. Accordingly, the aspherical surface amount is preferably decreased by giving the two surfaces an aspherical shape.

The front unit LF preferably includes the negative lens G11 having the negative refractive power, the negative lens G12 having the negative refractive power, a negative lens G13 having the negative refractive power, and a positive lens G14 having the positive refractive power in this order from the object side to the image side. If the front unit LF is formed by using three lenses, the negative refractive power of the negative lenses G11 and G12 increases too much, and many various aberrations occur at the wide angle end, and they are difficult to correct. Also, if the front unit LF is formed by using five or more lenses, the thickness of the front unit LF in the optical axis direction increases due to the increase in number of lenses, and the front lens effective aperture increases.

Each embodiment includes the variable stop SSP for holding the f-number constant during zooming. The aperture of the aperture stop SP may also be varied during zooming instead of using the variable stop SSP. Furthermore, the present invention is readily applicable to a zoom lens which includes no variable stop SSP and in which the f-number varies.

The preferred embodiments of the present invention have been explained above, but the present invention is not limited to these embodiments, and various modifications and changes can be made without departing from the spirit and scope of the invention.

An embodiment in which the zoom lens disclosed in any of the first to third embodiments is applied to an image pickup device will be explained below with reference to FIG. 8. The image pickup device of the present invention includes an interchangeable lens device including the zoom lens, and a camera body connected to the interchangeable lens device via a camera mount portion so as to be detachable, and including an image pickup element that receives an optical image formed by the zoom lens and converts the image into an electrical image signal.

FIG. 8 is a schematic view showing main parts of a single-lens reflex camera. Referring to FIG. 8, an image pickup lens 10 includes a zoom lens 1 of any of the first to third embodiments. The zoom lens 1 is held by a lens barrel 2 as a holding member. A camera body 20 includes a quick return mirror 3 for reflecting a light beam from the image pickup lens 10 upward, and a focusing screen 4 arranged in an image formation device of the image pickup lens 10. In addition, the camera body 20 includes a penta dach prism 5 for converting a reverse image formed on the focusing screen 4 into an erect image, and an eyepiece 6 for observing the erect image.

A solid-state image sensor (photo-electric conversion element) such as a CCD sensor or CMOS sensor that receives an image formed by a zoom lens or a silver halide film is arranged on a photosurface 7. When performing image sensing, the quick return mirror 3 retracts from the optical path, and the image pickup lens forms an image on the photosurface 7. The benefits explained in the first to third embodiments are effectively received by an image pickup device as disclosed in this embodiment. The present invention is also applicable to a mirror-less camera including no quick return mirror 3 as an image pickup device.

Next, numerical value examples of each embodiment of the present invention will be presented below. In each numerical value example, i indicates the ordinal number of a surface from the object side, ri indicates the curvature radius of a lens surface, di indicates a lens thickness and air space between the ith surface and (i+1)th surface, and ndi and vdi respectively indicate a refractive index and Abbe's number with respect to the d-line. BF is a back focus indicated by the distance from the final lens surface to the image plane. The total lens length is the distance from the first lens surface to the image plane. When the X-axis is the optical axis direction, the H-axis is a direction perpendicular to the optical axis, the light propagation direction is positive, R is the paraxial curvature radius, K is a conic constant, and A4, A6, A8, A10, A12, and A14 are aspherical constants, an aspherical shape is represented by:

$$X = \frac{(1/R)H^2}{1+\sqrt{1-(1+K)(H/R)^2}} + A4H^6 + A6H^6 + A8H^8 + A10H^{10} + A12H^{12}$$

Also, [e+X] means $[\times 10^{+X}]$, and [e-X] means $[\times 10^{-X}]$. An aspherical surface is indicated by adding * after the surface number. Furthermore, a portion where the interval d of each optical surface is (variable) means that this interval changes during zooming, and surface intervals corresponding to focal lengths will be presented later in the form of a table. A back focus is the distance from the final lens surface to the image plane.

Numerical Example 1

| Surface data | | | | | |
|---|---|---|---|---|---|
| Surface number | r | d | nd | vd | |
| 1* | −714.708 | 3.50 | 1.61881 | 63.9 | |
| 2* | 18.302 | 10.77 | | | light ray effective aperture Φ41.904 |
| 3* | 2652.907 | 2.30 | 1.85400 | 40.4 | |
| 4* | 59.913 | 6.83 | | | light ray effective aperture Φ35.549 |
| 5 | −79.670 | 1.50 | 1.88300 | 40.8 | |
| 6 | 609.260 | 0.15 | | | |
| 7 | 57.388 | 5.68 | 1.85478 | 24.8 | |
| 8 | −274.202 | (variable) | | | |

-continued

| | | | | |
|---|---|---|---|---|
| 9 | 139.830 | 2.34 | 1.90366 | 31.3 |
| 10 | −368.538 | 0.15 | | |
| 11 | 59.098 | 1.30 | 1.80809 | 22.8 |
| 12 | 27.990 | 4.74 | 1.67270 | 32.1 |
| 13 | 221.033 | (variable) | | |
| 14 | 33.253 | 1.40 | 1.84666 | 23.9 |
| 15 | 20.583 | 9.34 | 1.48749 | 70.2 |
| 16 | −69.598 | (variable) | | |
| 17 (stop) | ∞ | 0.37 | | |
| 18 | 40.851 | 2.51 | 1.80518 | 25.4 |
| 19 | 179.546 | 1.00 | 1.88300 | 40.8 |
| 20 | 23.132 | 5.10 | | |
| 21 | −24.288 | 1.00 | 1.88300 | 40.8 |
| 22 | −96.070 | 0.15 | | |
| 23 | 66.825 | 2.85 | 1.80809 | 22.8 |
| 24 | −140.949 | 0.91 | | |
| 25 | ∞ | (variable) | | |
| 26 | 31.530 | 6.73 | 1.43875 | 94.9 |
| 27 | −409.060 | 0.15 | | |
| 28 | 65.846 | 1.40 | 1.91082 | 35.3 |
| 29 | 22.330 | 11.70 | 1.49710 | 81.6 |
| 30* | −75.251 | 0.15 | | |
| 31 | 636.187 | 4.65 | 1.49700 | 81.5 |
| 32 | −52.782 | | | |
| Image plane | ∞ | | | |

Aspheric surface data

1st surface

K = −4.05739e+003  A4 = 3.01972e−006  A6 = 8.60626e−010
A8 = −8.42670e−013  A10 = 7.14481e−016

2nd surface

K = −1.27171e+000  A4 = −5.02670e−006  A6 = −5.29014e−009
A8 = −1.88454e−011  A10 = 3.72226e−014

3rd surface

K = −5.24115e+005  A4 = −5.68107e−006  A6 = −2.46923e−010
A8 = 1.38578e−011  A10 = −9.61882e−015

4th surface

K = 6.58507e+000  A4 = 3.24729e−006  A6 = 2.74626e−008
A8 = −1.01486e−011  A10 = −3.80375e−014

30th surface

K = 1.83032e+000  A4 = 9.78498e−006  A6 = −2.27347e−009
A8 = 1.82814e−011  A10 = −3.46919e−014

Various data
Zoom ratio 2.06

| | Wide angle | Intermediate | Telephoto |
|---|---|---|---|
| Focal length | 16.49 | 23.74 | 33.94 |
| F-number | 2.91 | 2.91 | 2.91 |
| Half view angle (°) | 52.69 | 42.35 | 32.51 |
| Back focus | 38.74 | 48.38 | 63.65 |
| d8 | 31.93 | 13.49 | 1.97 |
| d13 | 5.64 | 5.21 | 8.50 |
| d16 | 1.99 | 7.35 | 13.26 |
| d25 | 12.15 | 6.79 | 0.89 |

Numerical Example 2

Surface data

| Surface number | r | d | nd | νd |
|---|---|---|---|---|
| 1* | 183.061 | 3.60 | 1.77250 | 49.6 |
| 2* | 18.775 | 10.57 | | light ray effective apertureΦ43.840 |
| 3* | 1058.296 | 2.60 | 1.85400 | 40.4 |
| 4* | 68.022 | 8.64 | | light ray effective apertureΦ35.309 |
| 5 | −47.914 | 1.70 | 1.81600 | 46.6 |
| 6 | 1591.821 | 0.15 | | |
| 7 | 71.381 | 6.86 | 1.76182 | 26.5 |
| 8 | −86.077 | (variable) | | |
| 9 | 247.846 | 2.76 | 1.91082 | 35.3 |
| 10 | −132.691 | 0.15 | | |
| 11 | 78.424 | 1.30 | 1.80809 | 22.8 |
| 12 | 22.742 | 8.16 | 1.69895 | 30.1 |
| 13 | 2407.764 | (variable) | | |
| 14 | 43.534 | 1.40 | 1.84666 | 23.9 |
| 15 | 27.861 | 9.26 | 1.48749 | 70.2 |
| 16 | −54.039 | (variable) | | |
| 17 (stop) | ∞ | 2.36 | | |
| 18 | −227.039 | 1.25 | 1.91082 | 35.3 |
| 19 | 81.866 | 3.14 | | |
| 20 | −36.296 | 1.00 | 1.77250 | 49.6 |
| 21 | 34.161 | 4.90 | 1.80809 | 22.8 |
| 22 | −154.966 | 1.00 | | |
| 23 | ∞ | (variable) | | |
| 24 | 30.920 | 7.56 | 1.43875 | 94.9 |
| 25 | −73.302 | 0.15 | | |
| 26 | 42.823 | 1.40 | 1.88300 | 40.8 |
| 27 | 21.224 | 15.56 | 1.49700 | 81.5 |
| 28 | −23.116 | 1.60 | 1.85400 | 40.4 |
| 29* | −65.384 | 0.94 | | |
| 30 | −54.664 | 3.55 | 1.48749 | 70.2 |
| 31 | −30.624 | | | |
| Image plane | ∞ | | | |

Aspheric surface data

1st surface

K = 2.55273e+001  A4 = 9.46075e−007  A6 = 1.74787e−009
A8 = −3.10852e−013  A10 = −1.97990e−016

2nd surface

K = −1.32889e+000  A4 = −3.50901e−006  A6 = −5.21122e−009
A8 = −2.85662e−011  A10 = 3.08407e−014

3rd surface

K = −2.48714e+004  A4 = −7.71603e−006  A6 = 6.08601e−009
A8 = 1.27414e−011  A10 = −1.40967e−014

4th surface

K = 1.06865e+001  A4 = 2.69825e−006  A6 = 2.90854e−008
A8 = 5.40256e−011  A10 = −8.70560e−014

29th surface

K = 5.47709e+000  A4 = 8.99092e−006  A6 = 3.22048e−009
A8 = 4.88293e−012  A10 = 2.48336e−014

Various data
Zoom ratio 2.06

| | Wide angle | Intermediate | Telephoto |
|---|---|---|---|
| Focal length | 16.49 | 23.70 | 33.94 |
| F-number | 2.91 | 2.91 | 2.91 |
| Half view angle (°) | 52.69 | 42.39 | 32.51 |
| Back focus | 39.46 | 48.77 | 65.23 |
| d8 | 29.62 | 12.80 | 1.99 |
| d13 | 10.71 | 9.98 | 5.36 |
| d16 | 1.00 | 6.19 | 10.11 |
| d23 | 10.10 | 4.91 | 0.98 |

Numerical Example 3

Surface data

| Surface number | r | d | nd | vd | |
|---|---|---|---|---|---|
| 1* | −598.122 | 3.00 | 1.58313 | 59.4 | |
| 2* | 17.070 | 9.05 | | | light ray effective aperture Φ33.951 |
| 3* | 6248.352 | 2.00 | 1.88100 | 40.1 | |
| 4* | 39.597 | 6.16 | | | light ray effective aperture Φ28.203 |
| 5 | −48.208 | 1.20 | 1.69680 | 55.5 | |
| 6 | 95.203 | 0.15 | | | |
| 7 | 46.106 | 6.57 | 1.73800 | 32.3 | |
| 8 | −55.298 | (variable) | | | |
| 9 | 33.665 | 1.00 | 1.91082 | 35.3 | |
| 10 | 19.256 | 5.08 | 1.61340 | 44.3 | |
| 11 | −191.559 | 6.03 | | | |
| 12 (stop) | ∞ | 1.09 | | | |
| 13 | 27.578 | 1.00 | 1.84666 | 23.9 | |
| 14 | 19.068 | 5.98 | 1.48749 | 70.2 | |
| 15 | −63.756 | (variable) | | | |
| 16 | ∞ | 1.74 | | | |
| 17 | 98.630 | 1.98 | 1.84666 | 23.9 | |
| 18 | −71.909 | 0.80 | 1.88300 | 40.8 | |
| 19 | 26.542 | 3.11 | | | |
| 20 | −21.627 | 0.80 | 1.91082 | 35.3 | |
| 21 | −51.448 | 0.15 | | | |
| 22 | 69.313 | 2.08 | 1.80809 | 22.8 | |
| 23 | −101.915 | (variable) | | | |
| 24 | 27.664 | 5.91 | 1.49700 | 81.5 | |
| 25 | −89.372 | 0.15 | | | |
| 26 | 60.294 | 1.20 | 1.91082 | 35.3 | |
| 27 | 19.013 | 10.82 | 1.49700 | 81.5 | |
| 28 | −34.912 | 2.10 | 1.85400 | 40.4 | |
| 29* | −46.251 | | | | |
| Image plane | ∞ | | | | |

Aspheric surface data

1st surface

K = 0.00000e+000    A4 = 1.67599e−005    A6 = −2.73317e−008
A8 = 4.29576e−011   A10 = −4.11597e−014   A12 = 2.02289e−017

2nd surface

K = −1.45241e+000   A4 = 4.19025e−006    A6 = 2.69893e−008
A8 = −1.29894e−010  A10 = 4.51693e−014

3rd surface

K = 0.00000e+000    A4 = −2.09213e−005   A6 = 9.18487e−008
A8 = −1.89361e−010  A10 = 1.47522e−013

4th surface

K = −1.14035e+001   A4 = 2.70484e−005    A6 = 3.92019e−008
A8 = 5.54112e−011   A10 = −6.06951e−014

29th surface

K = 6.54796e+000    A4 = 2.04925e−005    A6 = 2.21798e−008
A8 = 1.48999e−010   A10 = −6.11464e−013   A12 = 2.70504e−015

Various data
Zoom ratio 2.07

| | Wide angle | Intermediate | Telephoto |
|---|---|---|---|
| Focal length | 16.48 | 23.72 | 34.13 |
| F-number | 4.10 | 4.10 | 4.10 |
| Half view angle (°) | 52.70 | 42.37 | 32.37 |
| Backfocus | 38.99 | 48.87 | 63.71 |
| d8 | 28.11 | 12.16 | 1.94 |
| d15 | 1.52 | 4.33 | 7.30 |
| d23 | 6.93 | 4.13 | 1.15 |

TABLE 1

| | First Embodiment | Second Embodiment | Third Embodiment |
|---|---|---|---|
| Conditional Expression (1) | 0.4317 | 0.4417 | 0.4437 |
| Conditional Expression (2) | −1.7459 | −1.6580 | −1.7620 |
| Conditional Expression (3) | −0.3768 | −0.4971 | −0.4854 |
| Conditional Expression (4) | 1.8540 | 1.8540 | 1.8810 |
| Conditional Expression (5) | 63.85 | 49.62 | 49.62 |
| Conditional Expression (6) | 0.0228 | 0.0321 | 0.0121 |
| Conditional Expression (7) | 0.5607 | 0.5446 | 0.7578 |
| Conditional Expression (8) | −0.9821 | −0.9266 | −0.9116 |
| Conditional Expression (9) | −1.6797 | −1.3949 | −1.4886 |
| Conditional Expression (10) | 1.4811 | 1.7170 | 1.1893 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-084687, filed Apr. 15, 2013, which is hereby incorporated by reference herein in its entirety.

What is claimed is:

1. A zoom lens comprising a front unit including one lens unit having a negative refractive power, and a rear unit including an aperture stop and one or more lens units and having a positive refractive power as a whole, in an order from an object side to an image side, an interval between adjacent lens units changes during zooming such that an interval between the front unit and the rear unit decreases at a telephoto end when compared to a wide angle end,
   wherein the front unit includes a negative lens G11 in a position closest to the object side, and a lens surface of the negative lens G11 on the image side has an aspherical shape by which the positive refractive power increases from a center to an edge, and
   wherein, when a length in an optical axis direction from a surface vertex of a lens surface of the negative lens G11 on the object side to an edge of an effective aperture of the lens surface on the image side is t11, a radius of the effective aperture of the lens surface of the negative lens G11 on the object side is y111, a focal length of the negative lens G11 is f11, a focal length of the front unit is f1, a synthetic focal length of the rear unit at the wide angle end is f2w, and a focal length of a whole system at the wide angle end is fw, conditional expressions below are met:

$$0.36 < t11/y111 < 0.47$$

$$-2.0 < f11/fw < -1.3$$

$$-0.58 < f1/f2w < -0.20.$$

2. The zoom lens according to claim 1, further comprising a negative lens G12 on the image side of the negative lens G11,
   wherein the negative lens G12 has an aspherical lens surface by which the negative refractive power increases from a center to an edge.

3. The zoom lens according to claim 1, further comprising a negative lens G12 on the image side of the negative lens G11, and wherein, when a refractive index of a material of the negative lens G12 is N12, a conditional expression below is met:

1.80<N12<2.10.

4. The zoom lens according to claim 1, wherein, when an Abbe number of a material of the negative lens G11 is ν11, a conditional expression below is met:

40<ν11<70.

5. The zoom lens according to claim 1, wherein the lens surface of the negative lens G11 on the object side has an aspherical shape, and wherein, when an aspherical surface amount at a height equal to 70% of a radius of a light ray effective aperture of the lens surface of the negative lens G11 on the object side is Asph112, a refractive index of a material of the negative lens G11 is N11, and an interval on an optical axis between a lens surface, which is closest to the object side, of the front unit and a lens surface, which is closest to the image side, of the front unit is D1, a conditional expression below is met:

0.010<Asph112×(N11−1)/D1<0.040.

6. The zoom lens according to claim 1, wherein the lens surface of the negative lens G11 on the object side has an aspherical shape, the zoom lens further comprises a negative lens G12 on the image side of the negative lens G11, a lens surface of the negative lens G12 on the object side has an aspherical shape, and wherein, when an aspherical surface amount at a height equal to 70% of a radius of a light ray effective aperture of the lens surface of the negative lens G11 on the object side is Asph112, an aspherical surface amount at a height equal to 70% of a radius of a light ray effective aperture of a lens surface of the negative lens G12 on the object side is Asph122, and an interval on an optical axis between a lens surface, which is closest to the object side, of the front unit and a lens surface, which is closest to the image side, of the front unit is D1, a conditional expression below is met:

0.30<(Asph122×(N12−1)/D1)/(Asph112×(N11−1)/D1)<1.00.

7. The zoom lens according to claim 1, wherein two lens surfaces of the negative lens G11 have an aspherical shape.

8. The zoom lens according to claim 1, further comprising a negative lens G12 having two aspherical lens surfaces on the image side of the negative lens G11.

9. The zoom lens according to claim 1, wherein, when a focal length of a whole system at the telephoto end is ft, a conditional expression below is met:

−1.20<f1/√(fw×ft)<−0.80.

10. The zoom lens according to claim 1, wherein the rear unit includes a 1st lens unit having the positive refractive power, a 2nd lens unit having the negative refractive power, and a 3rd lens unit having the positive refractive power, in an order named from the object side to the image side, and the lens units move during zooming such that an interval between the 1st lens unit and the 2nd lens unit increases, and an interval between the 2nd lens unit and the 3rd lens unit decreases at a telephoto end when compared to a wide angle end.

11. The zoom lens according to claim 10, wherein, when a focal length of the 2nd lens unit is f22, and a focal length of a whole system at the telephoto end is ft, a conditional expression below is met:

−2.50<f22/√(fw×ft)<−1.00.

12. The zoom lens according to claim 10, wherein, when a focal length of the 3rd lens unit is f23, and a focal length of a whole system at the telephoto end is ft, a conditional expression below is met:

1.00<f23/√(fw×ft)<2.00.

13. The zoom lens according to claim 10, wherein the 1st lens unit includes a 1st sub lens unit having the positive refractive power and a 2nd sub lens unit having the positive refractive power, and an interval between the 1st sub lens unit and the 2nd sub lens unit changes during zooming.

14. An image pickup device comprising a zoom lens, and a solid-state image sensor configured to receive an image formed by the zoom lens, wherein the zoom lens includes a front unit including one lens unit having a negative refractive power, and a rear unit including an aperture stop and one or more lens units and having a positive refractive power as a whole, in an order named from an object side to an image side, an interval between adjacent lens units changing during zooming such that an interval between the front unit and the rear unit decreases at a telephoto end when compared to a wide angle end, the front unit includes a negative lens G11 in a position closest to the object side, and a lens surface of the negative lens G11 on the image side has an aspherical shape by which the positive refractive power increases from a center to an edge, and wherein, when a length in an optical axis direction from a surface vertex of a lens surface of the negative lens G11 on the object side to an edge of an effective aperture of the lens surface on the image side is t11, a radius of the effective aperture of the lens surface of the negative lens G11 on the object side is y111, a focal length of the negative lens G11 is f11, a focal length of the front unit is f1, a synthetic focal length of the rear unit at the wide angle end f2w, and a focal length of a whole system at the wide angle end is fw, conditional expressions below are met:

0.36<t11/y111<0.47

−2.0<f11/fw<−1.3

−0.58<f1/f2w<−0.20.

* * * * *